(12) United States Patent
Shorr et al.

(10) Patent No.: US 6,270,671 B1
(45) Date of Patent: Aug. 7, 2001

(54) METHOD AND APPARATUS FOR MICROFILTRATION

(75) Inventors: Jacob Shorr, Lexington; John Paul Toohil, Ashland, both of MA (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/478,839

(22) Filed: Jan. 7, 2000

Related U.S. Application Data (60) Provisional application No. 60/125,980, filed on Mar. 24, 1999, provisional application No. 60/122,025, filed on Feb. 26, 1999, and provisional application No. 60/115,139, filed on Jan. 8, 1999.

(51) Int. Cl.[7] .................................................. B01D 61/22
(52) U.S. Cl. ......................... 210/637; 210/137; 210/193; 210/321.87; 210/639; 210/641; 210/696; 210/808
(58) Field of Search ..................................... 210/137, 143, 210/193, 194, 195.2, 321.69, 321.87, 335, 636–639, 641, 651–654, 696, 702, 778, 805, 416.1, 650, 808

(56) References Cited

U.S. PATENT DOCUMENTS

| | | |
|---|---|---|
| 3,976,569 | 8/1976 | Sheppard et al. . |
| 4,574,049 * | 3/1986 | Pittner ................................. 210/639 |
| 4,610,792 | 9/1986 | Van Gils et al. . |
| 4,670,150 * | 6/1987 | Hsiung et al. ....................... 210/636 |
| 5,152,904 | 10/1992 | Kedem et al. . |
| 5,269,934 | 12/1993 | Dubrovsky et al. . |
| 5,505,841 | 4/1996 | Pirbazari et al. . |
| 5,527,466 * | 6/1996 | Li et al. ............................... 210/636 |
| 5,695,644 * | 12/1997 | Buchanan et al. ................... 210/696 |
| 5,766,479 * | 6/1998 | Collentro et al. .................... 210/641 |
| 6,120,689 * | 9/2000 | Tonelli et al. ....................... 210/641 |

FOREIGN PATENT DOCUMENTS

| | | |
|---|---|---|
| 2 229 379 | 9/1990 | (GB) . |
| 10085513 | 4/1998 | (JP) . |

OTHER PUBLICATIONS

PCT/US00/00316, International Search Report dated May 15, 2000.
Kraus et al., "Hyperfiltration Studies VI. Salt Rejection by Dynamically–Formed Polyelectrolyte Membranes," Desalination, 1:255–230, 1966.

(List continued on next page.)

Primary Examiner—Joseph W. Drodge
(74) Attorney, Agent, or Firm—Wolf, Greenfield & Sacks, P.C.

(57) ABSTRACT

A method and apparatus for microfiltration useful in softening water as well as in removing other dissolved constituents where the method comprises passing water that contains a precipitate through a semipermeable tubular membrane. Filtrate is received from the outside of the tubular membrane and the filtrate contains levels of dissolved compounds at concentrations below those that would be predicted by the solubility limits of the compounds. The method may be practiced at elevated pressures and turbulent flow without incurring significant fouling of the membrane. It is particularly suited to removing cations such as calcium and magnesium that contribute to water hardness. The water may be treated prior to passing through the membrane by adjusting pH, adding complimentary anions, or adding a flocculant. The apparatus comprises a series of semipermeable tubular membranes housed in a module. The membranes are fluidly connected to an inlet and two outlets. A momentary dynamic membrane is disposed on the inner surface of the tubular membrane.

20 Claims, 7 Drawing Sheets

OTHER PUBLICATIONS

Kraus et al., "Hyperfiltration Studies X. Hyperfiltration With Dynamically–Formed Membranes," Desalination, 2:243–266, 1967.

Kuppers et al., "Filtration of Organic Solutes by Dynamically Formed Membranes," Separation Science, 2:617–623, Nov. 1967.

Shor et al., "Hyperfiltration Studies XI. Salt–Rejection Properties of Dynamically Formed Hydrous Zirconium (IV) Oxide Membranes," Journal of Physical Chemistry, 72:2200–2206, Jun. 1968.

Shor et al., "Hyperfiltration—Concentration Polarization in Tubular Systems with Dynamically Formed Membranes," I & EC Fundamentals, 7:44–48, Feb. 1968.

Thomas et al., "Hyperfiltration—Reduction of Concentration Polarization of Dynamically Formed Hyperfiltration Membranes by Detached Turbulence Promoters," I & EC Process Design and Development, 7:397–399, Jul. 1968.

Thomas et al., "Hyperfiltration Studies XII. Reduction of Concentration Polarization of Dynamically Formed Hyperfiltration Membranes by Detached Turbulence Promoters," I & EC Research Results, 1–18, undated, reprinted in part in "Hyperfiltration—Reduction of Concentration Polarization of Dynamically Formed Hyperfiltration Membranes by Detached Turbulence Promoters," I & EC Process Design and Development, 7:397–399, Jul. 1968.

* cited by examiner

METHOD AND APPARATUS FOR MICROFILTRATION

CROSS REFERENCE TO RELATED APPLICATIONS

This application claims priority to U.S. provisional application Ser. No. 60/125,980 filed Mar. 24, 1999 titled "Improved Water Softening Using Microfiltration" and to U.S. provisional application Ser. No. 60/122,025 filed Feb. 26, 1999 titled "Improved Lime Softening Using Microfiltration" and to U.S. provisional application Ser. No. 60/115,139 filed Jan. 8, 1999 titled "System and Method for Softening Water."

BACKGROUND OF THE INVENTION

1. Field of the Invention

The present invention is directed to a method and apparatus to reduce the concentration of dissolved species in water and, more specifically, to a method and apparatus for microfiltration.

2. Description of the Related Art

Water may contain a variety of materials including, among other contaminants, divalent cations that increase the "hardness" of the water. The most prevalent divalent cations contributing to hardness are calcium and magnesium. Hard water may present a variety of problems for users in residential or industrial use. In addition, due to their negative solubility coefficients, calcium and magnesium in the water may precipitate out and form scale on heat exchange surfaces. Elevated levels of hardness may make it more difficult to remove other undesirable components such as other ionic compounds or organic compounds and may foul water treatment systems. For example, reverse osmosis membranes may be fouled by even relatively low levels of hardness.

Several techniques exist for the reduction of water hardness. For instance, calcium and magnesium cations may be removed by ion exchange where calcium and magnesium ions are exchanged for alternative cations that have a less deleterious effect in the water. Such methods require a source of alternative cations and are limited by the relative affinity of various ion exchange substrates to the competing cations as well as by the kinetics of the ion exchange itself. After use, these ion exchange substrates, for example, ion exchange resins, must be either recharged or replaced.

Calcium, magnesium and silica may also be removed by precipitation or "lime softening." Generally, either lime or soda ash, or both, is added to the water to reduce the amounts of calcium, magnesium and silica that are in solution to about the level of solubility of calcium carbonate and magnesium hydroxide, respectively. The precipitated matter is then removed from the water either by filtration or by settling.

Traditionally, lime softening involves the conversion of soluble salts in water into non-soluble salts. In some non-critical applications, there is no need to separate the sediments from the water. In more critical applications, separation and removal of the non-soluble salts is mandatory. Therefore, separation processes, as well as chemical processes, may be involved in lime water softening.

A conventional sedimentation following flocculation and agglomeration is currently employed as the most common method of separation.

A significant improvement of the separation technique was achieved by using membranes as a separation media. In 1983, D. Comstock, et al. published results of the "Hydroperm" process using cross flow microfiltration as a separation device after the lime softening process. Kedem, et al., in U.S. Pat. No. 5,152,904, describe water treated by the addition of sodium hydroxide being contacted with large excess of specific-sized calcium carbonate crystals followed by separation.

The conventional methods of water softening, however, suffer from high operating and capital cost, limited throughput, or insufficient reduction in concentrations of various ions such as calcium, magnesium or silica.

SUMMARY OF THE INVENTION

The present invention provides a method and apparatus for microfiltration. The method uses cross-flow microfiltration through sub-micron filtration media to reduce the level of, for example, calcium and magnesium, to concentrations that may be below that which is predicted by the solubility limits of calcium and magnesium salts under similar conditions.

In one embodiment, the method of the invention includes passing water including a precipitate through a substantially tubular semipermeable membrane. The membrane is comprised of sub-micron filtration media. The filtrate is then collected from the outer surface of the membrane, wherein the filtrate contains concentrations of dissolved precipitate at levels below the solubility limit of the precipitate.

In another embodiment, the apparatus of the invention includes at least one substantially tubular membrane having an inner wall and an outer wall, the inner wall defining a lumen. An inlet is in fluid communication with the lumen of the membrane. A momentary dynamic membrane including calcium carbonate is disposed on a portion of the inner wall of the membrane. A first outlet is in fluid communication with the lumen of the membrane, and a second outlet is in fluid communication with the outer wall of the membrane.

In another embodiment, the invention includes a method of reducing the concentration of divalent cations in an aqueous fluid. The method includes adding an anion to an aqueous fluid at a concentration adequate to precipitate out at least some dissolved cations in the form of a salt. The fluid containing precipitated salt is then passed along a semipermeable substantially tubular membrane. Aqueous fluid is then collected outside of the substantially tubular membrane, wherein the aqueous fluid contains dissolved divalent cations at a molar concentration below the molar solubility limit of the salt.

In another embodiment, the invention is directed to a method of pretreating water. The method includes adding an anion to the water at a level adequate to precipitate out at least a portion of any cations present in the water. The water is then passed through a substantially tubular membrane at turbulent flow. Filtrate is then collected from the substantially tubular semipermeable membrane.

In another embodiment, the invention is directed to a method of pretreating water. The method includes adding a cation to the water at a level adequate to precipitate out at least a portion of any anions present in the water. The water is then passed through a substantially tubular semipermeable membrane at turbulent flow. Filtrate is then collected from the substantially tubular semipermeable membrane.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

The invention provides a method and apparatus for reducing the concentration of dissolved materials, such as ionic compounds contributing to hardness, in water. The invention uses a cross-flow, semipermeable membrane technique to produce water with reduced levels of dissolved compounds, particularly lower levels of divalent cations. The present method and system may provide the advantage of an increased filtration rate at relatively lower costs. Using the method and system of the present invention provides for the removal of hardness components as well as the removal of other elements such as silica, while meeting the standards of pre-treated water for reverse osmosis and for direct reuse in other applications such as low pressure boiler feed water. The method and apparatus may also be useful in the reduction of heavy metals such as lead, cadmium and mercury.

Divalent cations contribute to the "hardness" of water. Generally, water is considered to be "hard" if it contains greater than 120 mg/L of divalent cations measured as calcium carbonate. The present invention serves to remove a variety of compounds, among these divalent cations, from the water and therefore provides a method for softening the water. Three of the ionic constituents that can be removed by the method are calcium, magnesium and silica.

The method is practiced by passing water through a tube that comprises a porous semi-permeable membrane. The membrane is comprised of sub-micron filtration media, i.e., filtration media having a pore size of less than 1 micron. A portion of the water passes through the lumen of the tube while another portion of the water permeates through the walls of the tubular membrane and is collected from "outside" the tubular membrane. It is this filtrate that may contain lower levels of target constituents. The water passing the length of the tube may be recycled and passed through the tube again or may flow to waste.

Prior or during the time the water is passing through the system, it may be treated to produce a precipitate in the water. Alternatively, the precipitate may be added directly to the water prior to its passage into the tubular membrane. One embodiment that may be practiced with the invention is to add a particular cation or anion that will react with corresponding ions already present in the water to produce a precipitate. For example, a source of carbonate ions, such as soda ash, may be added directly to the water to react with any calcium ions that may be in solution to produce a calcium carbonate precipitate. Another example is the addition of a magnesium salt to aid in the precipitation of silica. Alternatively, the precipitate may be provided by adding the undissolved material directly to the water, for example, calcium carbonate may be added to the water prior to its entry into the tubular membrane.

Regardless of how the material is introduced into the water, the suspended solids in the water may momentarily create a temporal "dynamic membrane." This dynamic membrane may form instantaneously when the filtration process is started and may require only the slightest amount of suspended solids in order to be effective. It appears that under proper conditions of turbulent flow and levels of suspended solids, an effective, but fleeting, deposition of solids may form along the inside surface of the membrane. As the pressure differential between the interior of the membrane and the exterior of the membrane forces water through the dynamic membrane and the semipermeable membrane, the concentration of dissolved salts in the water may be reduced below the theoretical solubility limits for the salts at similar pressures, temperatures and pH levels. It is believed that this dynamic membrane may be a factor in achieving the low levels of dissolved constituents that are obtainable by the present invention. For example, the permeate may contain concentrations of divalent cations, for example, calcium, at molar concentrations below the molar solubility limits for the salt, for example, calcium carbonate, that is suspended in the water supply. The solubility limit is the maximum concentration at which a particular substance (solute) is soluble in a particular fluid (solvent), i.e., the solute and solvent coexist in a single phase.

The amount of precipitate that is formed in, or added to, the water can be controlled by the operator of the system in any number of ways, for example, adjusting the concentration of ions added, adjusting the temperature of the water, adjusting the velocity of the flow, adjusting the turbulence of the flow, or adjusting the pressure of the fluid. By adjusting these parameters, among others, the operator may obtain an optimum amount of precipitate to allow for adequate flow through the walls of the tubular membrane with a reduction in specific dissolved species as well as a minimization of the frequency with which the tubular membrane must be cleaned. For example, it has been found that a flow exhibiting a Reynolds Number ($N_{Re}$) of around 3,910 provides better results than does a less turbulent at a very low $N_{Re}$ and also provides better results than does flow with a higher $N_{Re}$, for example, at a level of around 7,745. The optimum concentration for total suspended solids in the process fluid may vary depending on the composition of the process water and the desired results for the filtrate. A level of solids in the water of 2–3% has been shown to provide effective results. Solids may be removed from the system, such as by withdrawing from a concentration tank, in order to maintain the level of solids in an effective range.

The pH of the water may have an effect on the efficiency of the invention and may be adjusted to optimize the removal of various constituents. Generally, the pH is adjusted to maximize the precipitation of the constituent that is being removed from the water. The pH may be adjusted by the addition of an acid, base or buffer and careful monitoring and maintenance of an optimal pH may provide improved results. For instance, calcium carbonate is preferably precipitated at a pH greater than 8.0 and most preferably in a range of 9.0–9.5. Alternatively, magnesium hydroxide is preferably precipitated at a pH greater than about 10 and most preferably at a pH around 11.0. Silica may also be precipitated effectively at a pH greater than about 10. The ratios of various dissolved components to each other will change the optimal pH for compound removal, so the operator may want to deviate from these ranges given the presence of additional compounds, or for other reasons. In addition, a particular application may demand significant reductions in the concentration of one dissolved species while not being as concerned with others. In such a case, the pH may be adjusted to push the equilibrium in a direction to favor precipitation of a chosen compound. Some compounds that have been found useful in adjusting pH in the present invention are sodium hydroxide, magnesium hydroxide, carbon dioxide, lime, and hydrated lime. For example, silica and hardness may both be reduced by treating the sample by the addition of 200 milligrams per liter magnesium, 400 milligrams per liter sodium carbonate, and adjusting the pH to 11.0 with sodium hydroxide.

During operation of the invention, ions contributing to hardness may be constantly precipitated out, resulting in a reduction in alkalinity. To maintain adequate alkalinity in the process stream, levels of additives may be monitored and adjusted accordingly. For example, soda ash, caustic or acid may all be varied according to the rate of precipitation of various salts from the water. These dosages may be adjusted automatically by a process logic controller (PLC) or may be adjusted manually in response to changes in pH, total dissolved solids, total alkalinity, or other parameters that aid the operator in evaluating the state of the system.

Some applications of the invention may benefit from the use of a flocculent or coagulant. For example, water containing high levels of magnesium may be difficult to filter. Magnesium, among others, may form a precipitate of magnesium hydroxide that possesses a slime-like consistency when filtered. Such a precipitate may make a process water particularly difficult to filter and may require more frequent backwashing, backpulsing or cleaning. When called for, the invention allows for the addition of filtering aids such as ferric chloride which may make the precipitate more filterable.

Alternatively, the present invention may not require the extensive use of filtration aids that are used in conventional filtration systems. For example, the efficiency of the present invention may allow for an overall reduction or even an elimination of the use of coagulants and flocculents and may still provide acceptable results.

The rate of flow of the water through the microfiltration system affects the turbulence of the water inside the tubular membrane, a factor which it is believed is important in achieving the unprecedented results of the present invention. The Reynolds number ($N_{Re}$) provides a measurement of the amount of turbulent flow in a fluid. The "critical Reynolds number" corresponds to the transition from turbulent flow to laminar flow as the velocity is reduced. Its value depends upon the channel geometry, and may be in the range of 2,000 to 3,000 for circular pipe. (Perry's Chemical Engineers Handbook, 5th Edition, page 5–4, McGraw Hill, 1973.) It is believed that the method of the present invention may provide good removal efficiencies when the flow through the system is such that flow is turbulent. It is also believed that the efficiency of the method and apparatus may be superior at lower levels of turbulence than at higher levels. As shown in the examples provided, the invention operating at a $N_{Re}$ of 3,910 may give superior results to the invention operating at higher turbulence, e.g., a $N_{Re}$ of 7,745. A static system such as a conventional settling tank or a conventional membrane filtration system would exhibit a $N_{Re}$ of 0 or close to 0. These static systems do not provide the same ion removal efficiencies that the present invention does and thus the results achievable with the present invention apparently occur at flows that exhibit Reynolds numbers within an intermediate range, e.g., flows that may be above the critical Reynolds number but may not be excessively turbulent. Without wishing to be bound by any particular theory, the inventors believe that the optimum dynamic membrane is formed at levels of turbulence which are great enough to prevent any significant build up of precipitated material while at the same time not being so turbulent as to prevent even the momentary formation of an effective dynamic membrane. It is believed that it is this range that enables the filtrate to exit the semipermeable membrane containing ionic concentrations below those that would be predicted by the solubility limits of the precipitated salts. For example, the solubility of calcium carbonate ($CaCO_3$) at non-acidic pH is about 13 ppm (Lange's Handbook of Chemistry, Table 3.2, 14th Edition, McGraw Hill, 1992) while the method of the present invention may achieve reductions to sub ppm levels. Another example is magnesium hydroxide which has a solubility of about 9 ppm (Perry's Chemical Engineers' Handbook, p. 2–122, $7^{th}$ Edition, McGraw Hill, 1997) while the method of the present invention may achieve reductions to sub ppm levels.

The rate of flow through the lumen of the semipermeable tubular membrane may also be a factor in determining the efficiency of the method and apparatus of the present invention, independent of any particular relationship to Reynolds number. For example, acceptable results may be achieved, as shown in the examples below, at flow rates of 14.28 feet per second and flow rates of 15.42 feet per second.

Increasing the pressure of the water as it passes through the semipermeable tubular membrane increases the flux of filtrate through the membrane wall. Thus, cgreater flow rates are achieved at higher pressures. What is surprising is that at higher pressures, up to at least about 200 psi, there appears not to be any significant plugging of the membrane as one sees in a conventional lime softening filtration apparatus. What is also significant is that while operating at pressures as high as 200 psi, the invention has shown no reduction in the efficiency of calcium and magnesium removal. This allows for continued use of the system at high, efficient pressures, which in turn allows for greater throughput with lower energy input in a smaller space than conventional techniques.

Because it is preferable to operate at higher pressures, e.g., greater than 60 psi, rather than at lower pressures, a smaller diameter tube, for example, one half inch inner diameter, is preferred to a larger diameter one because of the smaller diameter tube's ability to withstand greater pressures. A concern with operating at higher pressure is the possible collapse of the semipermeable membrane due to its spongelike structure. It is believed that a semipermeable membrane capable of withstanding higher pressures would lead to even more efficient operation.

The temperature of the fluid passing through the semipermeable tubular membrane may also affect the rate of flux. In general, a higher temperature water will increase the rate of flux through the membrane. Therefore, the flux of filtrate through the membrane may be increased by either an increase in the pressure or the temperature of the water.

The apparatus of the invention may include any type of semi-permeable membrane. The semipermeable membrane may be comprised of any material that is at least partially permeable to water and retentive of precipitated solids, such as sub-micron filtration media. It may be any shape although it is preferred that the membrane be tubular. Preferably, the membrane is polymeric sub-micron filtration media. As the membrane may be exposed to elevated pressures, it may be supported by a more rigid material, for example, polyethylene, to prevent the membrane from ballooning or bursting. An asymmetric membrane of PVDF (KYNAR®) having a nominal pore size of 0.1 to 0.2 microns has been found to form an effective semi-permeable membrane. Preferably, the PVDF membrane is supported by a tube of sintered HDPE. Most preferably, the sintered IIDPE support material is extruded so that it does not contain any parting lines that might provide a point of weakness. Such a tubular membrane is available from U.S. Filter Corporation, Billerica, Mass., under the trademark "MP5."

The length and diameter of the tubular membrane may be determined by the desired flow rate through the system and the required Reynolds number to achieve the desired softening results. In general, smaller diameter tubes are capable of withstanding greater pressures than tubes of larger diameter, and thus are preferred at the higher pressures at which the invention may achieve optimal results. The diameter of the tubular membrane may be less than about an inch and may vary throughout the length of the tubing. Preferably, the inner diameter of the tubular membrane is less than about an inch and most preferably less than about one half inch. The length of the tubular membrane may be varied with the requirements of a particular installation and any number of tubular membranes may be run in parallel in a given system to provide the necessary output of treated water. The length of the tubing may be limited by the pressure drop that may occur between the inlet and the outlet of the tubular membrane.

The tubular membranes may be configured in a variety of ways, depending on the requirements of the operator. Generally, the tubes are run parallel to each other, close enough to minimize the footprint of the system but far enough apart so that the passage of filtrate through the membrane is not interfered with. Tubes may double back any number of times to accommodate a longer flow path for a particular tube. The tubular membranes are contained in a housing called a module, designed to withstand the rigors of the system. Preferably, the module is made of a polymer such as PVC or CPVC.

Any number of membrane modules may be joined together to form a train. In addition, the number of trains may be adjusted to accommodate the supply of treated water that is necessary for a particular application. In one embodiment, up to twelve modules are used in a single train. A module may comprise any number of separate tubes, and modules comprising 37 tubes of ½ inch diameter and 10 tubes of 1 inch diameter have been shown to provide effective results.

The inner surface of the tubing may be momentarily in contact with a dynamic layer of precipitated solids. For example, a dynamic layer of calcium carbonate has been shown to be effective in aiding in the removal of calcium ions from the water being treated. The effectiveness of the dynamic layer may be a function of many different variables including the concentration of precipitated solids in the water and the flow rate across the membrane. Any actual build-up of precipitated material along the wall of the membrane may have to be periodically reduced. This may be accomplished by any one of several methods, including, for example, increasing the rate of flow or washing the tubing with an acid to dissolve any excessively deposited materials.

Significant energy savings may be realized with the present invention through the use of two pumps to control the flow of fluid through the semipermeable tubular membranes. One pump maintains an adequate rate of flow through the system and may recycle solids laden water back through the filter module. This pump may also be used to assure that an appropriate pressure is maintained in the system. A second pump may be used to maintain liquid volume within the system and is used to make up fluid that may be lost from the system as filtrate.

If more than one module or more than one train is used, it may be possible to increase the total flux rate by intermittently turning off the recirculation pump. This may allow the internal pressure to maximize throughout the module or train, thereby providing for a greater rate of flux. At some point during this procedure, the precipitate build up along the interior wall of the tubular membrane may become thick enough to decrease the effective flux rate through the system. At this point, the recirculation flow may be restarted and may serve to remove a portion of the accumulated precipitant. This on/off procedure may be applied to a system using any number of trains or modules and the optimum ratio of on/off time may be determined by the operator.

Figure 6:
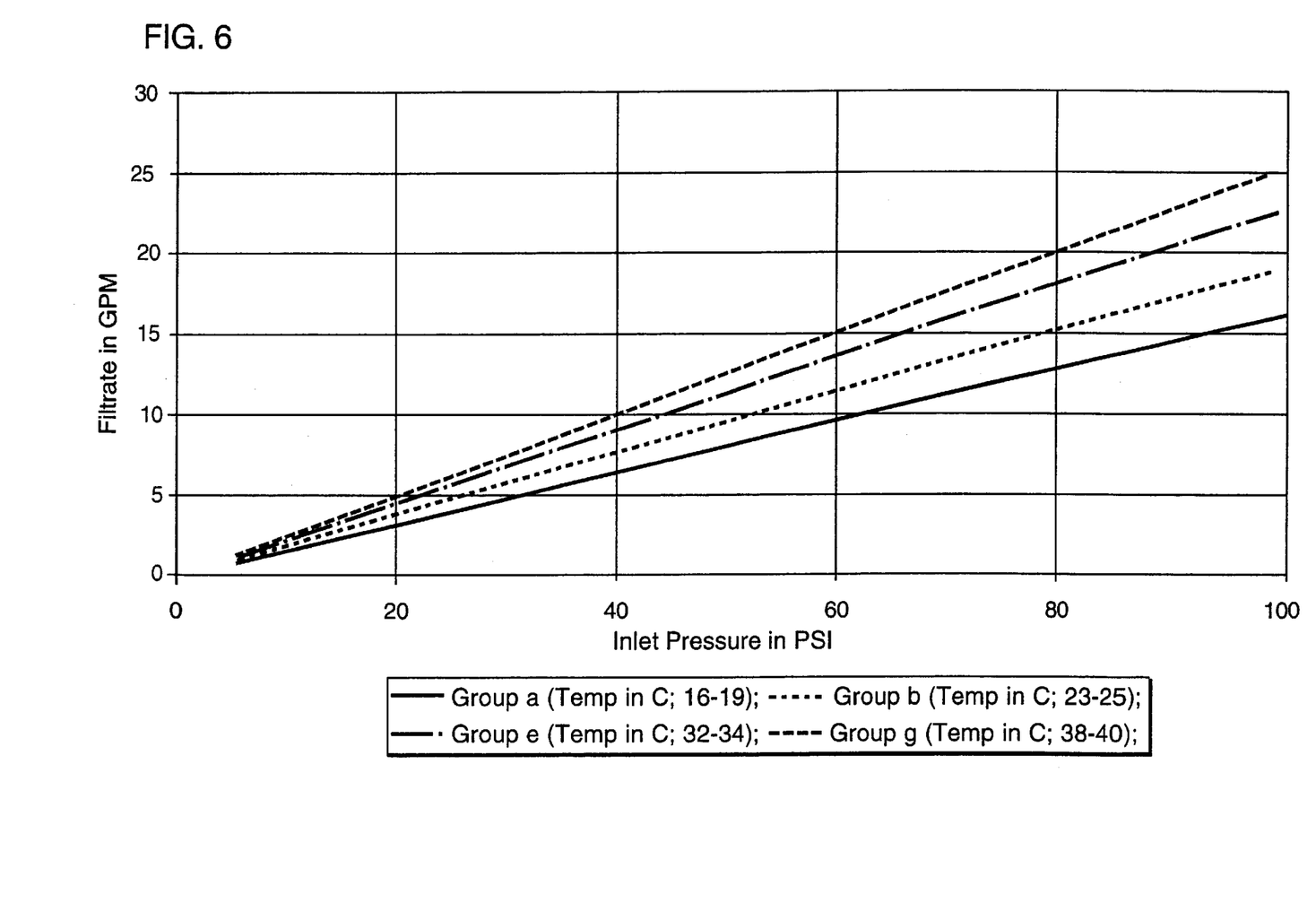
FIG. 6 is a graph of filtration rate as a function of pressure at constant temperatures.

As higher pressures generally result in increased flux rates, it may be preferable to operate the invention at elevated pressures. Effective softening has been found to take place when the system is operated at a transmembrane pressure of 30 psi. Increased flux rates may be realized at 40 and 60 psi and it is preferable that the invention be operated at pressures higher than 80 or 100 psi. Most preferably, the system is operated at a pressure of at least 150 psi and it is believed that operating at a pressure of 200 psi or greater would provide even greater flux rates. A relationship between filtration rate and pressure is illustrated in FIG. 6. The pressure is limited by among other things, energy considerations and the capability of the tubular membrane itself to withstand the higher pressures.

FIG. 6 illustrates the relationship between inlet pressure and filtrate flux at four different temperatures. The data were obtained from a system using tubes of PVDF on sintered HDPE having a half inch diameter and a six foot length, with thirty-seven tubes per module. The table illustrates that filtration rate increases generally linearly with inlet pressure. Note also that the slope of the relationship increases with temperature.

Figure 7:
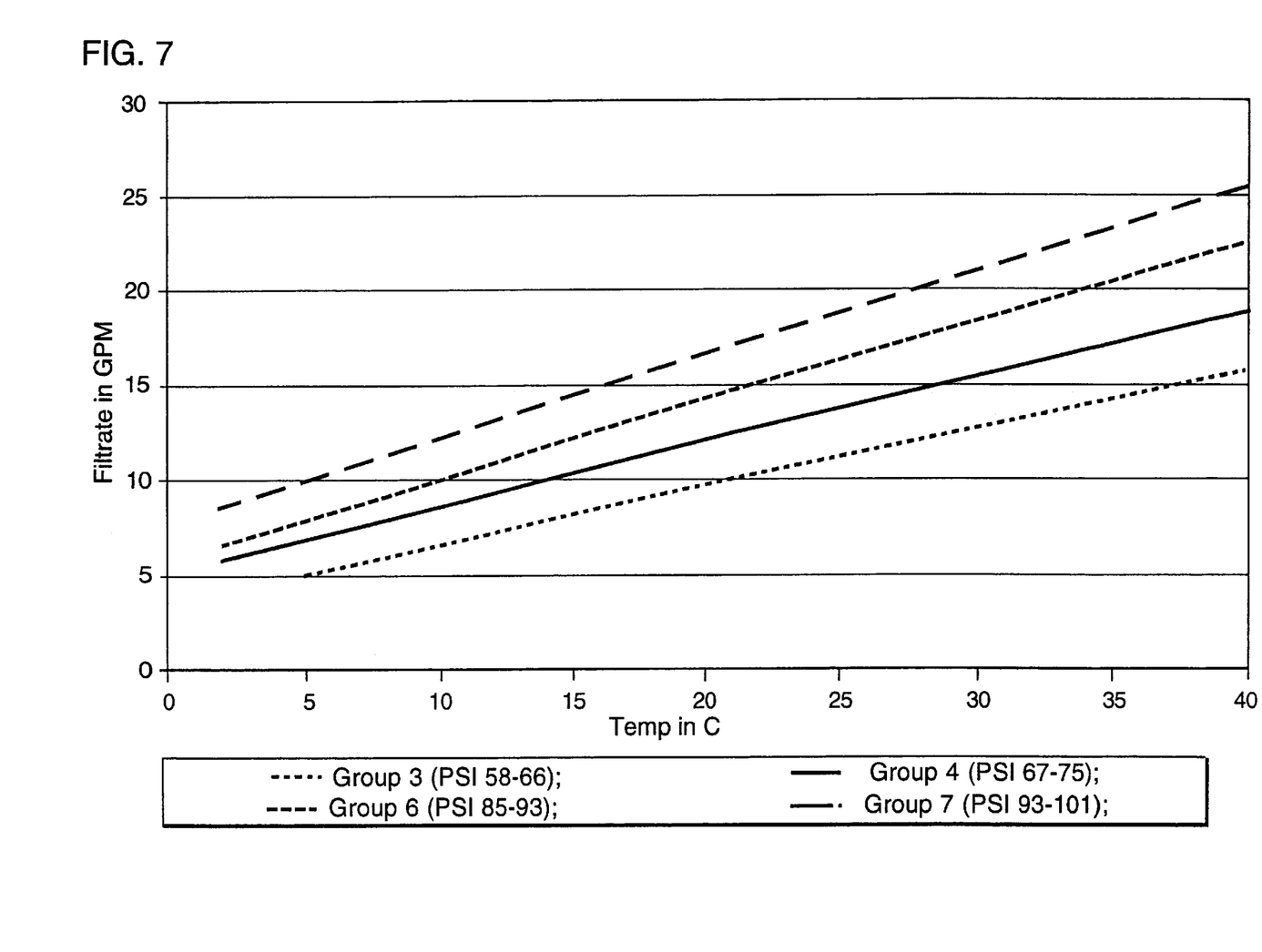
FIG. 7 is a graph of filtration rate as a function of temperature at constant pressures.

Temperature may also affect the flux rate with flux rate generally increasing with respect to an increase in temperature. FIG. 7 illustrates the relationship between filtrate flux and temperature at four different inlet pressure ranges. At each of the four pressure ranges, the flux rate increases linearly with temperature. FIGS. 6 and 7 illustrate that in at least one embodiment, the invention provides for an increased rate of flux at both higher temperatures and at higher pressures.

The following equation provides the relationship between flow through the membrane and temperature and pressure for a module containing thirty-seven six foot tubes with one half inch diameter and a total surface area of twenty-nine square feet.

$$F=[(0.0049) \times T+(0.066)] \times P$$

where,

F=flow in gallons per minute
T=temperature in degrees Celsius
P=pressure in PSI

To convert from gallons per minute to gallons per square foot per day (GFD) the flow, F, is multiplied by 49.58.

For a module with 10 one inch diameter tubes, the flow, F, is divided by 2.

Although the present invention allows for extended use at high pressures and high rates of flux, it may become necessary to clean the surface of the semipermeable tubular membrane. One method that may be used to do this is a high pressure back pulse through the tubular membrane using pressurized air as the motive force. Either at predetermined intervals or on demand, a high pressure back pulse may be applied to the outer surface of the membrane. The back pulse may serve to dislodge any scale or caked-on precipitate that has formed a layer that is either too thick or too dense to provide optimal filtration results. For example, a high pressure back pulse at thirty minute intervals during normal operation has been shown to increase performance. Another effective means of removing built up layers of precipitate from the wall of the membrane may be to increase the rate of flow or, alternatively, to decrease the pressure differential across the membrane.

More aggressive cleaning techniques may also be used. For example, to remove soluble precipitates from the surface of the membrane a solution of a dilute mineral acid may be circulated through the membrane module until the precipitate has been dissolved to an acceptable level. For example, both dilute HCl and $HNO_3$ have been found to provide effective results. The membranes may be allowed to soak in the cleaning fluid for a period of time and then generally, before being put back on line, the membrane module will be rinsed to a neutral pH. For example, a solution comprising 1.5% (v/v) HCl was cycled through the system of the invention for a five minute period followed by a fifteen minute soaking period. After the soaking period, the system was rinsed with process or tap water until it achieved approximately a neutral pH. This cleaning procedure resulted in a much greater flux rate than was measured prior to the cleaning procedure.

Figure 1:
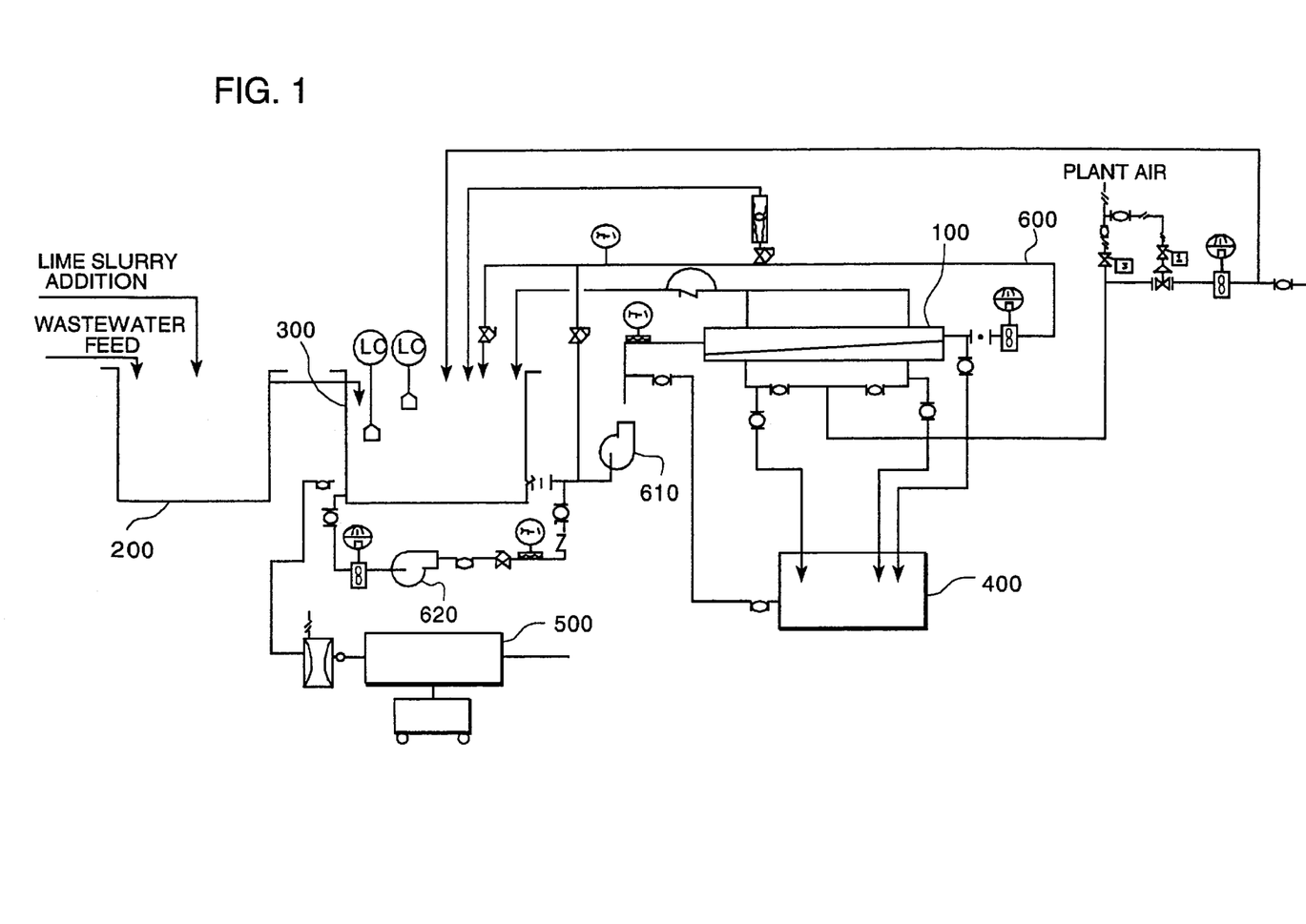
FIG. 1 is a schematic flow diagram of a system including an apparatus of the present invention.

FIG. 1 is a schematic illustration of a system according to one embodiment of the so present invention. This embodiment includes a membrane module 100, a reaction tank 200, a concentration tank 300, a cleaning tank 400, and a filter press 500. FIG. 1 also shows circulation loop 600 which recirculates fluid, including precipitated solids, back into reaction tank 300.

During operation of the invention according to the embodiment of FIG. 1, the water to be treated first enters reaction tank 200 where other chemicals such as lime or soda ash may be added to control the pH or adjust alkalinity or ionic strength. Other substances such as ferric chloride may also be added to help in clarification and filterability. The water then proceeds to the concentration tank 300 where the level of suspended solids may be monitored and adjusted. When the concentration of solids surpasses an optimum level, the solids may be removed and disposed of by passing them through the filter press 500. From the concentration tank 300 the process water is pumped through the filtration module 100 where a portion of the water, the filtrate, passes medially through the tubular membranes contained within the module. In this embodiment, any water containing suspended solids that passes completely through the lumen of the tubular membrane may enter circulation loop 600 where it is returned to the concentration tank. The filtration module is also fluidly connected to the cleaning tank 400 which may be used intermittently as a source of cleaning fluid to remove caked on precipitate or other unwanted debris from the surface of the filter membrane. The recirculation system 600 uses two separate pumps 610 and 620, one for maintaining adequate flow and pressure through the system and the second for maintaining volume. This multiple pump embodiment may allow for the use of lower horse power pumps, and therefore less energy consumption, than other filtration techniques. In an alternative embodiment, a series of energy efficient pumps may be used to yield a higher outlet pressure while allowing a "soft start." Such a system may deliver a flow of about thirteen to fifteen feet per second.

Figure 2:
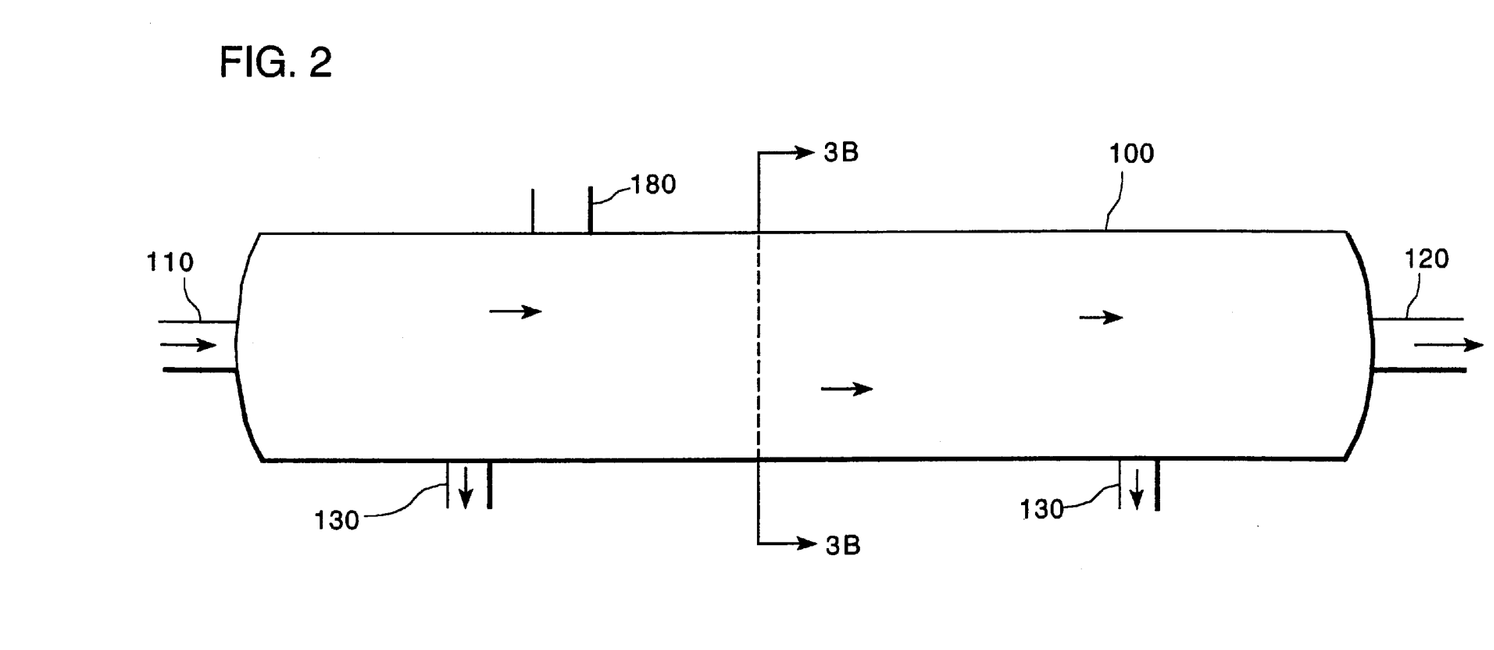
FIG. 2 is a schematic illustration of an apparatus of the present invention used in the system shown in FIG. 1.

FIG. 2 illustrates one possible embodiment of a filter module to be used with the invention. Processed water enters the module at inlet 110 and passes through a manifold (not shown) where the flow may be split into any number of separate individual tubular membranes. The process water which may contain suspended solids then passes through the lumen of the tubular membranes under pressure. A portion of the water passes through any dynamic membrane that may have been formed, as well as through the walls of the semipermeable tubular membrane. The water that passes through the walls of the tubular membrane, the filtrate, is then collected through outlets 130. The process water containing suspended solids that does not pass through the wall of the semipermeable tubular membrane exits the module at outlet 120 where it may be discharged or pumped into the recirculation loop where it may once again enter concentration tank 300O and then in series, the filtration module itself. Using, the recirculation technique, the level of suspended solids in the process water may be built up to an optimal level.

Figure 3A:
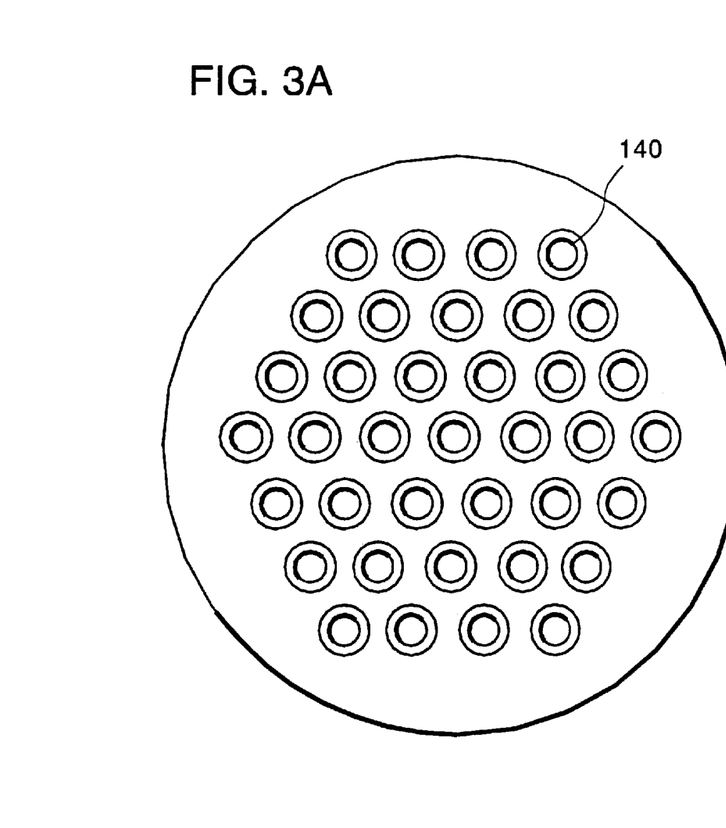
FIG. 3 is a cross-sectional view of the apparatus in FIG. 2, taken along section line 3—3.
Figure 3B:
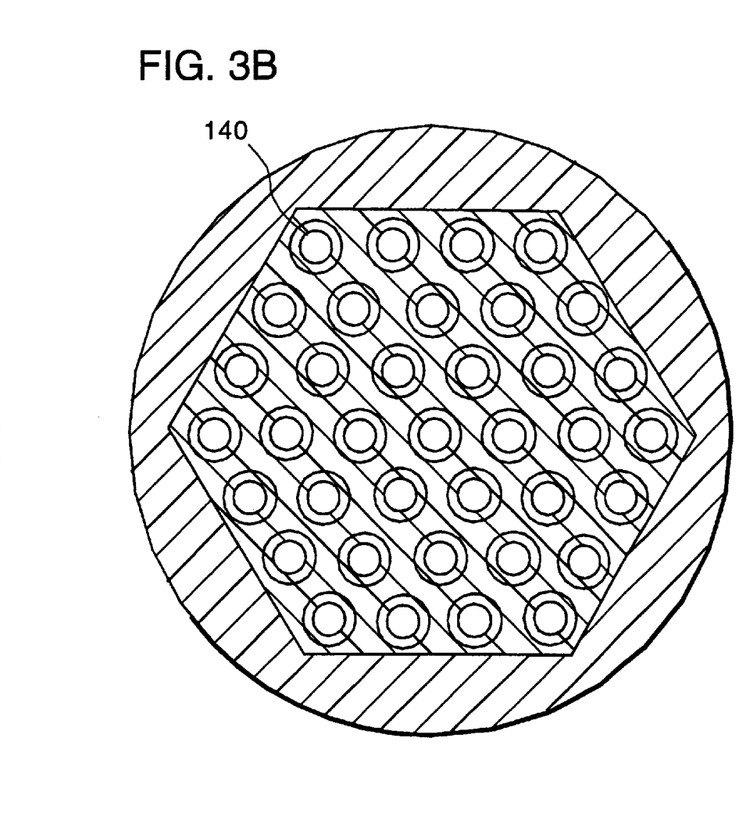

FIG. 3 glives two alternate views of a cross-section of the filter module showing, in this instance, thirty-seven semipermeable tubular membranes running parallel to each other. This cross-sectional view is taken at point 102 in FIG. 2 and is viewed along line 101.

Figure 4:
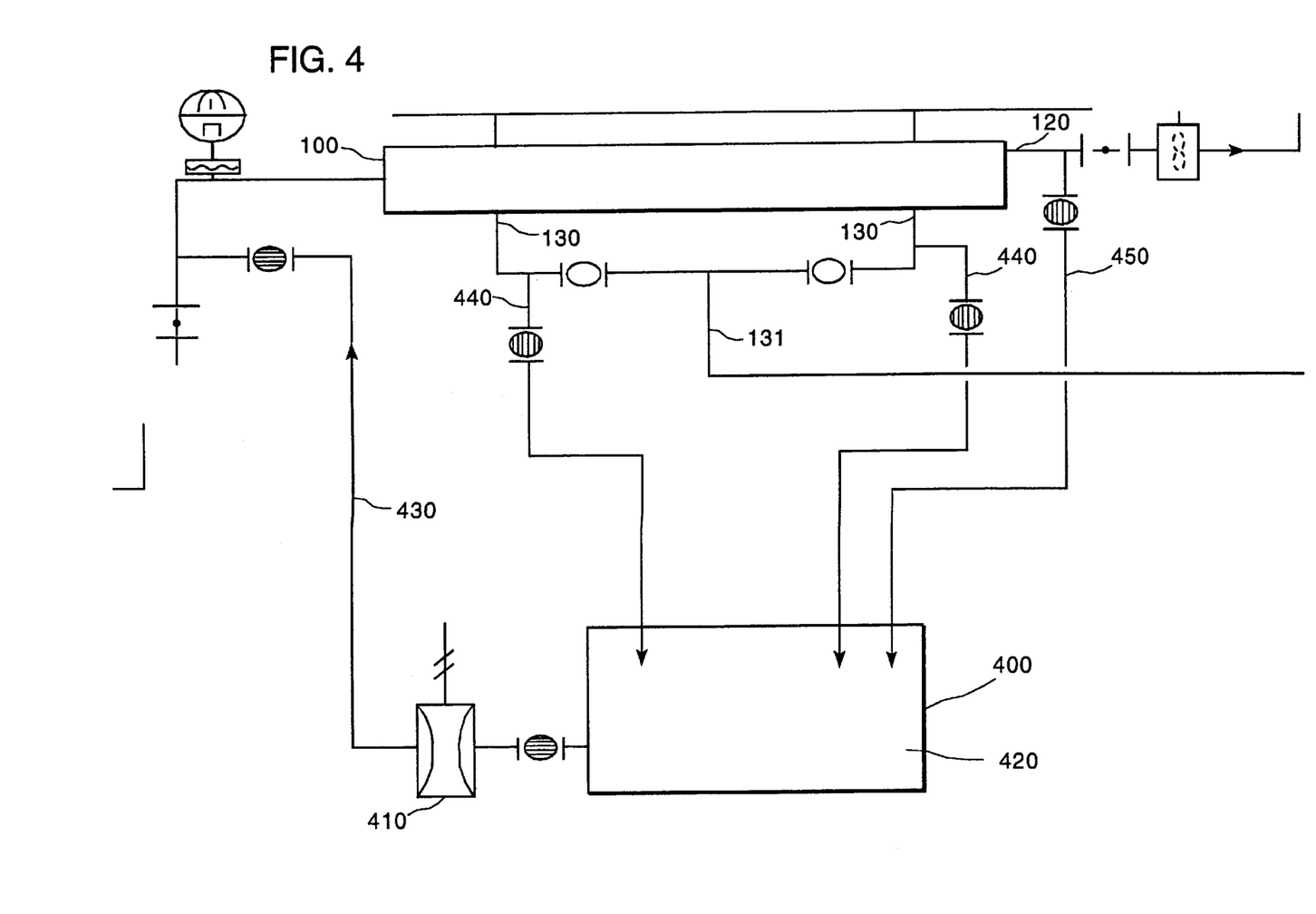
FIG. 4 is a schematic flow diagram of a portion of the system of FIG. 1.

FIG. 4 shows a cleaning module that may be used with the present invention when flux rates in the filter module 100 have dropped below acceptable levels. Cleaning tank 400 may contain a cleaning fluid 420, for example dilute mineral acid, which may be moved by a diaphragm pump 410 through feed line 430) and then through filter module 100 and the pores of the individual semipermeable tubular membranes that it contains. The cleaning, fluid may then dissolve some of the precipitates that may be responsible for the reduced level of flux in the membrane module. From the membrane module, the cleaning, fluid exits through filtrate outlets 130 if it has passed through the walls of the membrane and through outlet 120 if it has passed completely through the lumen of the tubular membrane. From there, the cleaning fluid may be gathered in lines 440 or 450 and is then returned to the cleaning talk 400 where it may either be roused or disposed of.

Figure 5:
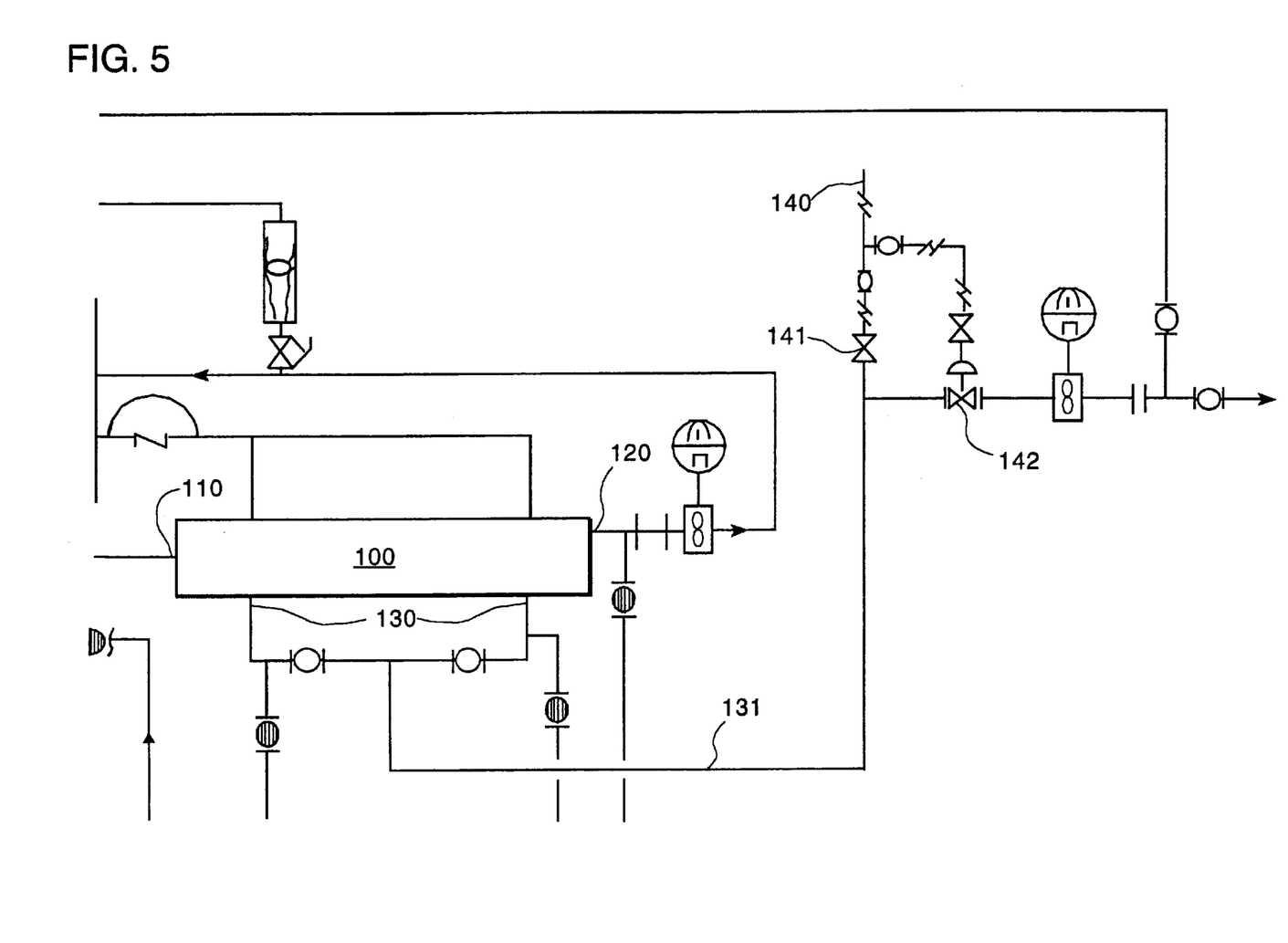
FIG. 5 is a schematic illustration of a portion of the system of FIG. 1.

FIG. 5 provides a schematic illustration of one embodiment of a back pulse system that may be used with the invention. When the membrane module 100 is to be back pulsed, a supply of pressurized air is introduced through conduit 140 and valve 141 is opened while valve 142 is closed. The blast of air then pushes liquid contained in conduit 131 through outlets 130 and into the membrane module 100. The sudden force of the water passing through the walls of the semipermeable membrane in a direction reverse to that of normal flow serves to dislodge any scale or caked on precipitate that may be present.

EXAMPLE 1

To determine the effectiveness of the method and apparatus of the present invention an actual sample of cooling tower water was tested for removal of silica and hardness. Table 1 below provides the initial sample analysis of the cooling tower water and includes constituents that may be of significant concern, e.g., calcium, magnesium and silica.

TABLE 1

| Initial Sample Analysis | |
|---|---|
| PH | 8.7 |
| Ca (total) | 131 mg/L |
| Mg | 24 mg/L |
| $SiO_2$ | 166 mg/L |
| Alkalinity | 32 mg/L $CaCO_3$ to pH 8.3 |

TABLE 1-continued

| Initial Sample Analysis | |
|---|---|
| | 322 mg/L $CaCO_3$ to pH 4.6 |
| Na | 106 mg/L |
| Cl | 150 mg/L |
| COD | <10 mg/L |
| Sulfate | 110 mg/L |
| Nitrate | <3 mg/L |
| Ammonia | <0.8 mg/L |

Table 2, below, compares the two systems that were tested. It provides operating parameters as well as some structural differences between the two embodiments.

TABLE 2

| Comparison of Two Systems operating at different Reynolds Numbers | | |
|---|---|---|
| | $N_{Re} \sim 7,745$ | $N_{Re} \sim 3,910$ |
| Diameter of Tube (inches) | 1.0 | 0.5 |
| Number of Tubes/Module | 10 | 37 |
| Membrane area/module | 15 $ft^2$ | 29 $ft^2$ |
| Entrance Area | 7.8 $inch^2$ | 7.3 $inch^2$ |
| Operating Pressure (Nominal) | <40 PSI | Up to 100 PSI |
| Flux in GFD (Nominal) | 300 GFD | 1000 GFD |
| Flow Capacity per Module (Nominal) | 2.5 GPM | 15 GPM |

Prior to filtering the cooling tower water, the water was treated by addition of the following:

200 mg/L Mg by addition of $MgCl_2 \cdot 6H_2O$

400mg/L sodium carbonate and

NaOH to a pH of 11.0 concentration in the filtrate.

Tables 3 and 4 below provide data describing the parameters under which the tests were run as well as the results for calcium, magnesium and silica. Table 3 provides results when the method of the invention was operated at a $N_{Re}$ of approximately 7,745. Table 4 provides results from an experiment in which the invention was operated at a $N_{Re}$ of approximately 3,910.

TABLE 3

| Membrane Test at a Reynolds Number of 7,745 | | | | | | | |
|---|---|---|---|---|---|---|---|
| | Inlet | Outlet | Flow | Permeate Analysis | | | |
| Run Time (Minutes) | Pressure (psi) | Pressure (psi) | Rate (GFD) | Silica (mg/l) | Calcium (mg/l) | Magnesium (mg/l) | pH |
| 0 | 30 | 18 | 1,140 | — | — | — | — |
| 15 | 30 | 18 | 1,020 | — | — | — | — |
| 30 | 30 | 18 | 950 | — | — | — | — |
| 45 | 30 | 18 | 890 | — | — | — | — |
| 60 | 30 | 18 | 770 | 20.0 | 35.2 | <0.5* | 11.0 |
| 90 | 30 | 18 | 760 | — | — | — | — |
| 120 | 30 | 18 | 630 | 19.8 | 32.3 | <0.5* | 11.0 |
| 150 | 30 | 18 | 630 | — | — | — | — |
| 180 | 30 | 18 | 630 | — | — | — | — |
| 210 | 30 | 18 | 630 | — | — | — | — |
| 240 | 30 | 18 | 620 | 10.8 | 13.8 | 10.7 | 11.0 |
| 2× Conc. | 30 | 18 | 610 | — | — | — | — |
| 4× Conc. | 30 | 18 | 610 | 8.5 | 9.4 | 7.5 | 11.0 |

Polymeric membrane, 1.0 inch diameter
Temperature,..........23° C.

TABLE 3-continued

Membrane Test at a Reynolds Number of 7,745

| Run Time (Minutes) | Inlet Pressure (psi) | Outlet Pressure (psi) | Flow Rate (GFD) | Permeate Analysis | | | pH |
|---|---|---|---|---|---|---|---|
| | | | | Silica (mg/l) | Calcium (mg/l) | Magnesium (mg/l) | |

Flux rate at 5× solids....610 GFD
Feed TSS.............411 mg/l

TABLE 4

Membrane Test at a Reynolds Number of 3,910

| Run Time (Minutes) | Inlet Pressure (psi) | Outlet Pressure (psi) | Flow Rate (GFD) | Silica (mg/l) | Calcium (mg/l) | Magnesium (mg/l) | pH |
|---|---|---|---|---|---|---|---|
| 0 | 34 | 30 | 850 | — | — | — | — |
| 15 | 34 | 30 | 730 | — | — | — | — |
| 30 | 34 | 30 | 630 | — | — | — | — |
| 45 | 34 | 30 | 590 | — | — | — | — |
| 60 | 34 | 30 | 540 | 9.0 | 4.2 | 1.8 | 11.0 |
| 90 | 34 | 30 | 540 | — | — | — | — |
| 120 | 34 | 30 | 540 | 3.8 | 2.7 | 1.0 | 11.0 |
| 150 | 34 | 30 | 540 | — | — | — | — |
| 180 | 34 | 30 | 540 | — | — | — | — |
| 210 | 34 | 30 | 540 | — | — | — | — |
| 240 | 34 | 30 | 540 | 2.0 | 2.2 | 0.5 | 11.0 |
| 2× Conc. | 34 | 30 | 490 | — | — | — | — |
| 4× Conc. | 34 | 30 | 440 | 2.1 | 2.2 | 0.5 | 11.0 |

Polymeric membrane, 0.5 inch diameter
Temperature,.................23° C.
Flux rate at 5× solids..........440 GFD
Feed TSS....................425 mg/l The results provided in tables 3 and 4 above show that by the time each of the systems was operating at a level of four times the initial concentration of solids, the silica, calcium and magnesium levels had all been reduced, in the filtrate, to levels below 10 ppm. The system operating at a Reynolds number of 3,910 (Table 4) provided superior results resulting in silica levels of 2.1 mg/L, calcium levels of 2.2 mg/L and magnesium levels of 0.5 mg/L. The results support the superior performance of the method and apparatus of the present invention when used to treat cooling tower water.

For the systems used to develop the test data in Tables 3 and 4, the following equation was used to calculate the Reynolds number.

$$N_{Re} = 3160 \frac{Q}{vd} \text{ where}$$

$Q$ = flow in $GPM$ $v$ = velocity in ft/s $d$ = diameter in inches $$v = 0.408 \frac{Q}{d^2}$$

Table 3, flow = 35 $GPM$

Table 4, flow = 9.45 $GPM$

For Table 3 (1" diameter tubes)

$$v = \left(\frac{35 \ GPM}{1^2}\right)(0.408) = 14.28 \ \text{ft/s}$$

$$N_{Re} = 3160 \ \frac{35 \ GPM}{14.28 \ \text{ft/sec} \ 1} = 7,745$$

For Table 4 (1/2" diameter tubes)

$$v = \left(\frac{9.45}{(0.5)^2}\right)(0.408) = 15.42 \ \text{ft/s}$$

$$N_{Re} = 3160 \left(\frac{9.45 \ GPM}{15.42 \ (0.5)}\right) = 3,910$$

EXAMPLE 2

To determine the effect of intermittently stopping the recirculation of water through the apparatus of the present invention, a system comprising two trains of eight modules per train was operated under the following conditions. The tubes were identical to the ½" tubes described above in Example 1. Both trains were supplied with process water at an inlet pressure of 150 psi. After achieving adequate build up of precipitated solids, the recirculation pump on the first train was stopped, causing axial flow through the lumen of the tubular membranes to slow or stop. At the same time, the pressure equalized throughout the train. Thus, 150 psi was maintained in the last module of the train as well as in the first and in those in between. This is in contrast to when the recirculation pump is in operation, as the final module generally exhibits a lower pressure, e.g., 50 psi lower, than the pressure in the first module of the train. Therefore, with a pressure of 150 psi throughout the train, the flux rate through the walls of the semipermeable tubular membranes was increased. After a set amount of time, the recirculation pump in the first train was restarted and the recirculation pump in the second train was stopped. This led to an increase in pressure in the second train and a subsequent increase in flux. This procedure was repeated so that whenever the recirculation pump in one train was off, the recirculation pump in the other train was operational. Upon restart of the recirculation pump in each train, the velocity of the fluid was increased beyond that of normal operating velocity to remove any excess precipitate that built up during the period of time when the flow had been stopped. This allowed for an increased flux rate in each train during the time that the flow was stopped as well as resulted in energy savings due to fewer pumping requirements.

The improved results shown by this test illustrate an additional embodiment that may provide for increased rate of flux and therefore increased filtrate flow while reducing the total amount of energy required to operate the apparatus.

EXAMPLE 3

To determine the different results achievable with the method and apparatus of the present invention in relation to conventional lime settling, a comparison was made between one embodiment of the cross-flow microfiltration technique of the present invention and a traditional lime softening technique. The same three water samples were treated by each method and the filtrate concentrations of calcium and magnesium were analyzed for each. The water was pretreated by adding soda ash to a level of 750 ppm and NaOH to achieve a pH>10.5. The samples were passed through a one half inch diameter tubular membrane of PVDF and recycled through the tubular membrane until a level of 4× solids (calcium carbonate) was obtained. A series of 37 tubular membranes, each six feet in length were contained in a single module. The pressure of the sample water supply throughout the test varied between 60 and 100 psi over the length of the tubular membrane and the filtrate flow was between 12 and 20 GPM for the module. The pH of the water was maintained between 10.5 and 12. The temperature of the system was maintained between 20 and 35 degrees Celsius.

The lime settling apparatus was sized to have the same throughput capacity as the microfiltration technique, 12 to 20 GPM. Soda ash was added to a level of 750 ppm and the pH of the treated water was also raised to >10.5 through the addition of NaOH. The temperature of the feed water was maintained between 20 and 35 degrees Celsius.

| Microfiltration Method | | | | | | |
|---|---|---|---|---|---|---|
| Sample # | Initial Conc. Ca | Initial Conc. Mg | Ca Conc. in the membrane | Mg Conc. in the membrane | Ca Conc. in the filtrate | Mg Conc. in the filtrate |
| 1 | 56.4 | 5.77 | 2030 | 403 | 0.24 | 0.02 |
| 2 | 55.2 | 6.12 | 1472 | 300 | 0.17 | 0.02 |
| 3 | 58.3 | 5.23 | 2118 | 423 | 0.17 | 0.03 |

| Settling Method | | | | | | |
|---|---|---|---|---|---|---|
| Sample # | Initial Conc. Ca | Initial Conc. Mg | Ca Conc. in the membrane | Mg Conc. in the membrane | Ca Conc. in the filtrate | Mg Conc. in the filtrate |
| 1 | 56.4 | 5.77 | NA | NA | 17.54 | 4.5 |
| 2 | 55.2 | 6.12 | NA | NA | 20.1 | 6.4 |
| 3 | 58.3 | 5.23 | NA | NA | 22.5 | 4.8 |

The results for each of the tests are provided above. All results are in ppm on a weight to weight basis. Note that the level of calcium and magnesium in the filtrate is about two orders of magnitude lower for the microfiltration technique than it is for the settling method. It is also notable that the concentration of calcium in the microfiltration filtrate is well below the solubility limit for calcium carbonate of about 13 ppm.

These results indicate that the method and apparatus of the present invention may reduce levels of silica, calcium and magnesium to well below those that are achievable with conventional lime settling methods.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A method comprising the steps of:
    flowing pressurized water including a precipitate through a substantially tubular semipermeable membrane comprising sub-micron filtration media and having an inner surface and an outer surface, wherein the flow of the water is turbulent; and
    collecting a filtrate from the outer surface of the membrane,
    wherein the filtrate contains a concentration of dissolved precipitate below the solubility limit of the precipitate.

2. The method of claim 1 wherein the flow of the water has a Reynolds number of less than about 7,745.

3. The method of claim 1 further comprising the step of momentarily forming a dynamic membrane along the inner surface of the substantially tubular semipermeable membrane.

4. The method of claim 3 wherein the flow of the water has a Reynolds number of less than about 7,745.

5. The method of claim 3 wherein the pressure differential across the membrane is greater than 100 psi.

6. A method comprising the steps of:
    flowing pressurized water including a precipitate through a substantially tubular semipermeable membrane comprising sub-micron filtration media and having an inner surface and an outer surface; and collecting a filtrate from the outer surface of the membrane, wherein the filtrate contains a concentration of dissolved precipitate below the solubility limit of the precipitate and wherein a pressure differential across the membrane is greater than 100 psi.

7. The method of claim 6 wherein the pressure differential across the membrane is greater than about 150 psi.

8. The method of claim 7 wherein the pressure differential across the membrane is greater than about 200 psi.

9. An apparatus comprising:

at least one substantially tubular semipermeable membrane comprising sub-micron filtration media and having an inner surface and an outer surface, the inner surface defining a lumen;

an inlet in communication with the lumen of the substantially tubular membrane;

a momentary dynamic membrane comprising calcium carbonate disposed on a portion of the inner wall of the substantially tubular semipermeable membrane;

a first outlet in communication with the lumen of the substantially tubular membrane; and a second outlet in communication with the outer wall of the substantially tubular membrane, wherein the membrane is capable of withstanding a pressure differential of greater than about 100 psi.

10. The apparatus of claim 9 wherein the membrane is capable of withstanding a pressure differential of greater than about 150 psi.

11. A method of pretreating water including at least one species of cation comprising the steps of:

adding an anion to the water at a level adequate to precipitate out a portion of any cations present in the water;

forming a precipitate;

passing the water through a substantially tubular semipermeable membrane comprising sub-micron filtration media, at turbulent flow; and recovering a filtrate from the substantially tubular semipermeable membrane, wherein the filtrate comprises dissolved precipitate at a concentration below the solubility limit of the precipitate.

12. The method of claim 11 wherein the cations comprise magnesium or calcium.

13. The method of claim 11 wherein the anion is carbonate.

14. The method of claim 11 wherein the anion is hydroxide.

15. The method of claim 11 wherein a portion of the water is obtained from a brine solution, the brine solution having been rejected from a reverse osmosis water treatment device.

16. The method of claim 15 further comprising feeding the filtrate to the reverse osmosis water treatment device.

17. A method of pretreating water including at least one species of anion comprising the steps of:

adding a cation to the water at a level adequate to precipitate out a portion of any anions present in the water;

forming a precipitate;

passing the water through a substantially tubular semipermeable membrane comprising sub-micron filtration media, at turbulent flow; and recovering a filtrate from the substantially tubular membrane, wherein the filtrate comprises dissolved precipitate at a concentration below the solubility limit of the precipitate.

18. The method of claim 17 wherein the precipitate comprises silica.

19. The method of claim 18 wherein a portion of the water is obtained from a brine solution, the brine solution having been rejected from a reverse osmosis water treatment device.

20. The method of claim 19 further comprising feeding the filtrate to the reverse osmosis water treatment device.

* * * * *